United States Patent [19]

Cook

[11] Patent Number: 5,024,301
[45] Date of Patent: Jun. 18, 1991

[54] HYDRAULIC REBOUND STOP ASSEMBLY FOR A SHOCK ABSORBER

[75] Inventor: Robert H. Cook, Farmington Hills, Mich.

[73] Assignee: Ford Motor Company, Dearborn, Mich.

[21] Appl. No.: 527,629

[22] Filed: May 23, 1990

[51] Int. Cl.$^5$ .............................................. F16F 9/48
[52] U.S. Cl. ................................... 188/284; 188/287; 188/322.11
[58] Field of Search ................... 188/284, 322.11, 314, 188/315, 322.15, 322.13, 279, 280, 281, 282, 311, 287, 316, 317, 322.17; 267/219, 221

[56] References Cited

U.S. PATENT DOCUMENTS

| | | |
|---|---|---|
| 2,861,795 | 1/1957 | Blake . |
| 3,057,441 | 10/1962 | Pribonic et al. ............... 188/284 |
| 3,621,949 | 11/1971 | Watson . |
| 3,787,019 | 1/1974 | Freitag . |
| 3,892,437 | 7/1975 | Nakinen . |
| 4,106,412 | 8/1978 | Farris et al. . |
| 4,328,960 | 5/1982 | Handke et al. . |
| 4,372,545 | 2/1983 | Federspiel . |
| 4,397,452 | 8/1983 | Fouts . |
| 4,500,075 | 2/1985 | Tsuchiya et al. . |
| 4,527,674 | 7/1985 | Mourray . |
| 4,591,031 | 5/1986 | Kirst . |
| 4,776,440 | 10/1988 | Yamada et al. . |
| 4,852,703 | 8/1989 | Nishimoto . |

FOREIGN PATENT DOCUMENTS 2158181 11/1985 United Kingdom .

Primary Examiner—Douglas C. Butler
Attorney, Agent, or Firm—Raymond L. Coppiellie; Roger L. May

[57] ABSTRACT

A shock absorber has a rebound stop assembly. The rebound stop assembly is mounted to the piston rod and includes an outer housing assembly slidably disposed within the working cylinder of the shock absorber and an inner housing member secured to the piston rod and slidably disposed in the outer housing member. The housing members define a damping chamber therebetween for receiving damping fluid therein. The rebound stop assembly also includes a damping device associated with the inner and outer housing members for creating a damping force in the shock absorber after a predetermined amount of rebound stroke of the piston within the working cylinder. A restrictive passage controls the flow of fluid from the damping chamber and this restrictive fluid flow provides additional damping at the end of the rebound stroke.

24 Claims, 3 Drawing Sheets

HYDRAULIC REBOUND STOP ASSEMBLY FOR A SHOCK ABSORBER

BACKGROUND OF THE INVENTION

1. Field of the Invention

This invention relates to a rebound stop for a shock absorber and, more particularly, to a hydraulic assisted rebound stop assembly.

2. Description of the Related Art

Typically, shock absorbers are designed such that the damping rate of the shock absorber becomes higher at the extreme ends of the rebound and compression strokes. The additional damping provided at these extreme ends prevents an abrupt halt to the piston rod travel as well as jarring metal-to-metal contact between the various parts in the shock absorber. A variety of mechanisms have been proposed to provide a higher damping rate at the two extremes. For example, U.S. Pat. Nos. 4,527,674 and 4,397,452, both assigned to the assignee of the present invention, disclose a rebound stop assembly including an elastomeric ring interposed between two collars, forming an annular chamber therebetween. At the end of the rebound stroke of the piston rod, the rebound stop assembly is compressed between the shoulders of the piston rod and the rod guide of the shock absorber until the elastomeric ring deforms to abut the inner wall of the working cylinder of the shock absorber. As the elastomeric ring deforms, the annular chamber decreases in volume. A restrictive passage formed between the elastomeric ring and the working cylinder of the shock absorber restricts the fluid flow from the annular chamber. The compression of the elastomeric ring and the restricted fluid flow provides additional damping at the end of the rebound stroke. It has been found, however, that after prolonged use under extreme temperatures not typically encountered in normal driving conditions, the elastomeric ring may degrade and the effectiveness of the rebound stop assembly maybe reduced or completely eliminated.

Secondary pistons also have been proposed to provide additional damping at the extreme end of the shock absorber. For example, U.S. Pat. No. 4,852,703 discloses the use of an additional piston fixed to the piston rod within the working cylinder of the shock absorber to provide additional damping at the end of the rebound stroke. As the piston rod nears the end of the rebound stroke in the '703 patent, the additional piston is forced into a fixed, tubular cylinder secured to the closed end of the shock absorber. Additional damping is provided by forcing hydraulic fluid from this tubular cylinder around the periphery of the additional piston. A similar type of rebound stop assembly is shown in GB 2,158,181, wherein a spring loaded additional piston is disposed above the main piston of the shock absorber. An elongated tubular cylinder extending the entire length of the working cylinder of the shock absorber is provided in a location opposite the outer surface of the additional piston. The additional piston travels within this fixed cylinder and additional damping is provided by forcing fluid from above the piston to below the piston. These types of rebound stop assemblies require elongated cylindrical tubings contained within the working cylinder of the shock absorber and are difficult and expensive to manufacture. The tolerances required to create effective damping are difficult to ensure.

Therefore, it is an object of the present invention to provide a hydraulic mechanical rebound stop assembly which effectively dampens motion of the piston at the end of its stroke while being economical to manufacture and assemble.

SUMMARY OF THE INVENTION

In accordance with the invention, a rebound stop assembly is disclosed for use in a telescopic shock absorber having a working cylinder with a piston slidably received therein attached to a piston rod which extends through a rod guide at one end of the cylinder. The rebound stop assembly is coaxially mounted about the piston rod between the piston and the rod guide. The assembly includes a generally cylindrical, cup-shaped outer housing member slidably disposed within the working cylinder which includes a central aperture at one end for receiving the piston rod therethrough. The assembly further includes a generally cylindrical, cup-shaped inner housing member disposed upon a shoulder secured to the piston rod. The inner housing member is slidably disposed in the outer housing member and includes a central aperture for receiving the piston rod therethrough. The inner and outer housing members define a damping chamber therebetween for receiving fluid therein. The assembly further includes a damping means operatively associated with the inner and outer housing members for creating a damping force in the shock absorber after a predetermined amount of rebound stroke of the piston within the working cylinder has taken place.

The damping means comprises means responsive to the relative axial movement of the inner housing member with respect to the outer housing member to control the flow of fluid from between the damping chamber and the rebound chamber of the working cylinder of the shock absorber. The means responsive to the relative movement of the housing members comprises an annular passage defined between the inner and outer housing members as well as an annular passage defined between the central aperture of the outer housing member and the piston rod.

In the preferred embodiment, the rebound stop assembly further includes a spring for biasing the position of the inner and outer housing members with respect to one another, the spring being disposed within the damping chamber. The outer housing member further includes a turned over edge circumferentially disposed at one end thereof for limiting the axial movement of the outer housing member with respect to the inner housing member to prevent axial separation of the members with respect to one another.

In an alternative embodiment, at least one metering orifice defined in the outer housing member and communicating with the working cylinder may also provide damping. Upon axial movement of the piston rod in the rebound direction, the outer housing member abuts the rod guide and upon further movement of the piston in the rebound direction, the inner housing member axially moves with respect to the outer housing member. This axial movement causes fluid within the damping chamber to be forced out of passageways to provide additional damping.

In another aspect of the present invention, a telescopic shock absorber comprises a working cylinder with a piston slidably received therein dividing the cylinder into jounce and rebound chambers and an enclosure closing one end of the working cylinder and having an opening to slidably receive the piston rod.

The piston has flow control means constructed to provide a restrictive fluid passage for the controlled flow of hydraulic fluid from one of the chambers to the other of the chambers when a piston is moved in a working cylinder to create a damping force. The shock absorber further includes a rebound stop assembly of the present invention fixedly secured to and movable with the piston rod comprising inner and outer housing members as generally described above, as well as damping means associated with the inner and outer housing members for creating a damping force in the shock absorber after a predetermined amount of rebound stroke of the piston within the working cylinder has occurred. The damping means contemplated in this embodiment is generally similar to that described above.

BRIEF DESCRIPTION OF THE DRAWINGS

Reference will now be made to the accompanying drawings in which.

DETAILED DESCRIPTION OF THE PREFERRED EMBODIMENTS

Figure 1:
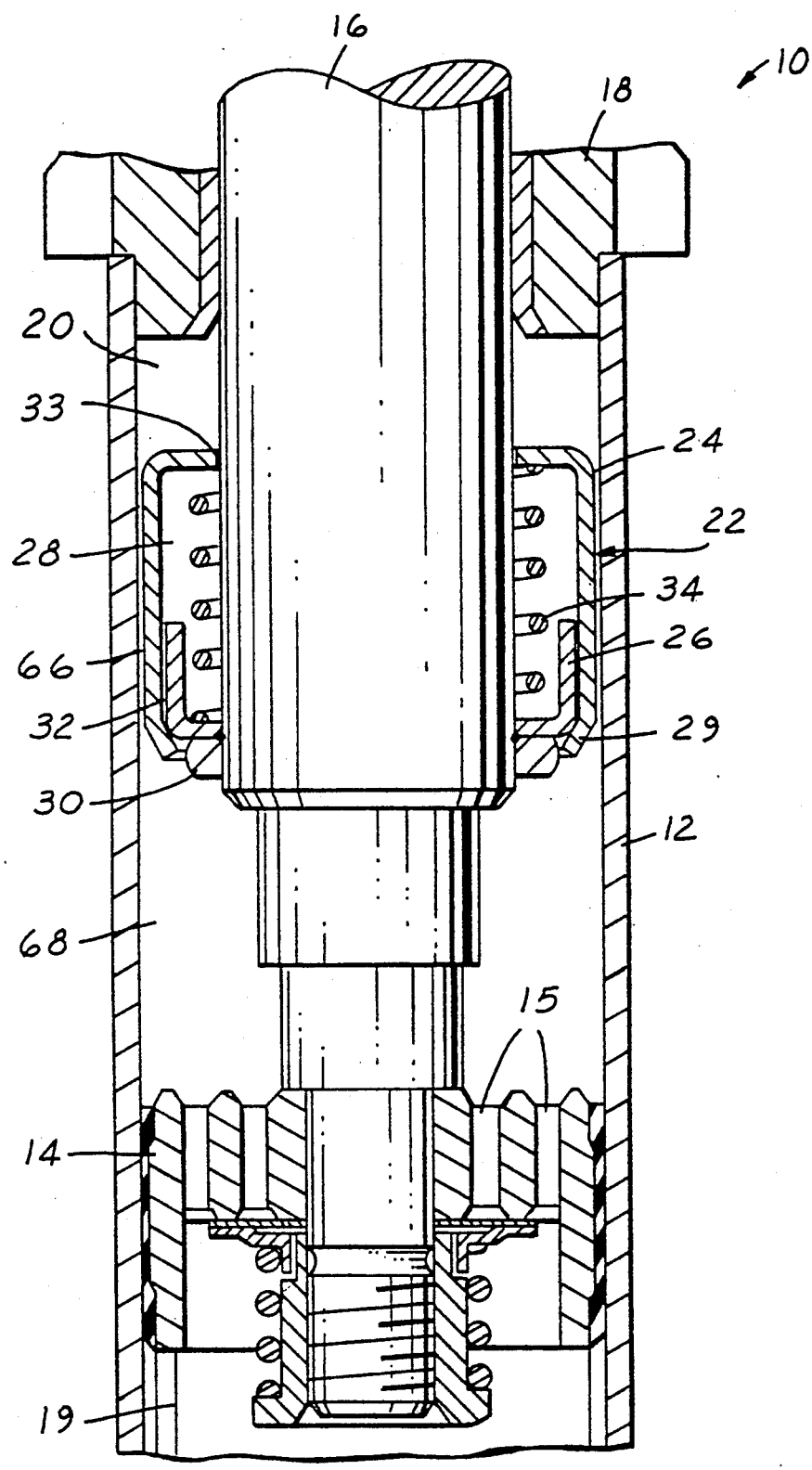
FIG. 1 is a fragmentary side elevational and partially segmented view of a shock absorber including a rebound stop assembly in accordance with the present invention.

Referring to FIG. 1, a shock absorber 10 has a working cylinder 12 with a piston 14 slidably mounted therein. The piston 14 includes valved restrictive passageways 15 and is fixedly connected to a piston rod 16. A rod guide 18 mounted at one end of the working cylinder 12 and piston 14 define a rebound chamber 20 within the cylinder 12 about the piston rod 16. As will readily be apparent to those skilled in the art, a jounce chamber 19 is defined below piston 14 and conventional shock absorbers of this known type provide damping between the roadwheels of a vehicle and the vehicle body as piston 14 and piston rod 16 axially slide within working cylinder 12 from the jounce to rebound positions as viewed in FIG. 1. A complete description of the operation of shock absorber 10 is deemed unnecessary here, it being understood that one skilled in the art is familiar with the operation of conventional suspension damping devices.

In accordance with the objective of the present invention, a rebound stop assembly 22 mounted to piston rod 16 within the working cylinder 12 provides additional damping at the end of the rebound stroke of the piston rod 16. The present invention may also be used in fluid powered linear actuators to dampen high velocity conditions at the extreme ends of these types of actuator cylinders.

Figure 4:
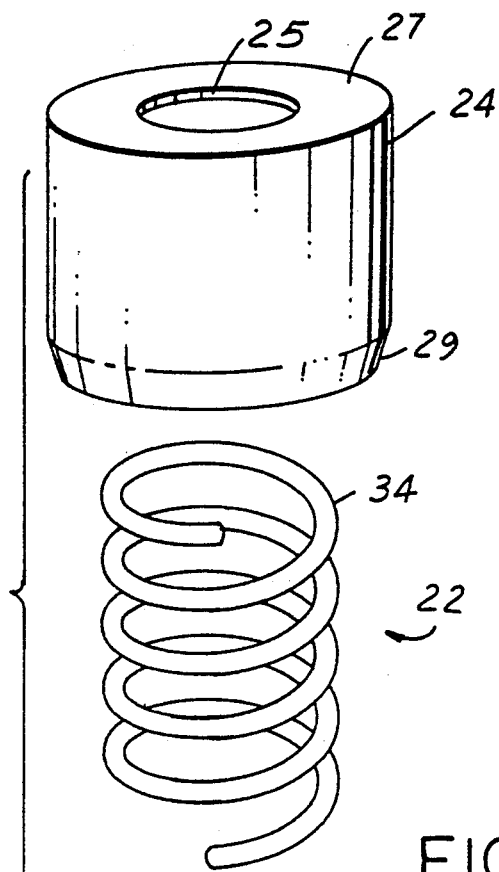
FIG. 4 is an exploded view of the rebound stop assembly shown in FIGS. 1-3.

Referring now to FIG. 4, the rebound stop assembly 22 includes a generally cylindrical, cup-shaped outer housing member 24 and a generally cylindrical, cup-shaped inner housing member 26. The outer housing member 24, slidably disposed within the working cylinder 12 as seen in FIG. 1, includes a centrally located aperture 25 located at a substantially planar end 27 for receiving the piston rod 16 therethrough. In the preferred embodiment, outer housing member 24 includes a turned over edge 29 circumferentially disposed at the end of the housing member opposite the substantially planar end 27. The purpose of the turned over edge 29 will be explained in further detail below. Outer housing member 24 may be formed by a wide variety of known manufacturing processes in a variety of different materials. In the preferred embodiment, outer housing member 24 is stamped from a low carbon steel. The present invention is not meant to be limited to this material or fabrication process, it being readily apparent to one skilled in the art that synthetic polymer materials, such as nylon or ABS, and other processes, such as casting or machining may be used to fabricate outer housing member 24 depending upon the overall functional requirements demanded of the assembly.

Inner housing member 26, secured to piston rod 16 axially slides within outer housing member 24 upon axial movement of piston rod 16 with respect to outer housing member 24. Inner housing member 26 includes a central aperture 23 disposed on a substantially planar end 31 for receiving piston rod 16 therethrough. Inner housing member 26 may be secured directly to piston rod 16 or may be mounted on top of a shoulder 30 as shown in FIG. 1. The shoulder 30 is fixed, at least in the axial direction, to the piston rod 16. Any number of known fastening methods, such as welding or brazing, may be used to secure inner housing member 26 to piston rod 16 or shoulder 30. Alternatively, the inner housing member 26 or the entire manufactured assembly 22 may simply be fit over piston rod 16 to rest upon shoulder 30 without securing the assembly to piston rod 16. As discussed above with reference to outer housing member 24, inner housing member may be formed in a variety of known processing methods and known materials. In the preferred embodiment, inner housing member is stamped from a low carbon steel.

The inner housing member 26 and outer housing member 24 define a damping chamber 28 filled with the hydraulic fluid found within the working cylinder 12 of the shock absorber 10. As shown in FIG. 4, a compression spring 34, disposed in the damping chamber 28, biases the position of the outer housing member 24 with respect to the position of the inner housing member 26. Spring 34 may be constructed to provide a limited amount of damping when the piston rod reaches the end of the rebound stroke. However, the intended purpose of spring 34 is merely to bias the position of the housing members with respect to one another. The additional damping of the shock absorber at the end of the rebound stroke provided by the rebound stop assembly 22 is performed by restricting the flow of the hydraulic fluid out of the damping chamber 28 during the relative axial movement of the inner housing member 26 with respect to the outer housing member 24 during extreme rebound stroke of the piston rod 16. As shown in FIGS. 1-4, the external diameter of the inner housing member 26 is slightly smaller than the internal diameter of the outer housing member 24 to form an annular clearance 32 therebetween. The additional damping provided by rebound stop assembly 22 is performed by the forced fluid flow of the fluid within the damping chamber 28 through the annular clearance 32 into the rebound chamber 20. Forcing fluid through annular clearance 32 provides constant damping for a given velocity of piston rod travel. As such, damping provided by stop assembly 22 varies with rod velocity.

Referring back to FIG. 1, the assembly 22 is mounted about the piston rod 16 seated on shoulder 30 within the rebound chamber 20. Specifically, the inner housing member 26 seats directly against shoulder 30 as described above. The assembly 22 slides through the rebound chamber 20 as the piston 14 correspondingly slides within the cylinder 12. The outer housing member 24 has an external diameter less than the internal diameter of working cylinder 12, thereby forming an annular gap 66 between the lower section 68 of the working cylinder and the rebound chamber 20. The restriction between sections 68 and 20 through gap 66 is comparable to the restriction through valves to passages 15 and piston 14. However, the assembly 22 does not interfere with the normal damping characteristics of the shock absorber 10 during its normal operation. To insure that assembly 22 does not provide additional damping during the normal stroke range of the shock absorber, the flow rate through annular gap 66 must be greater than the flow rate through the piston valving.

Figure 2:
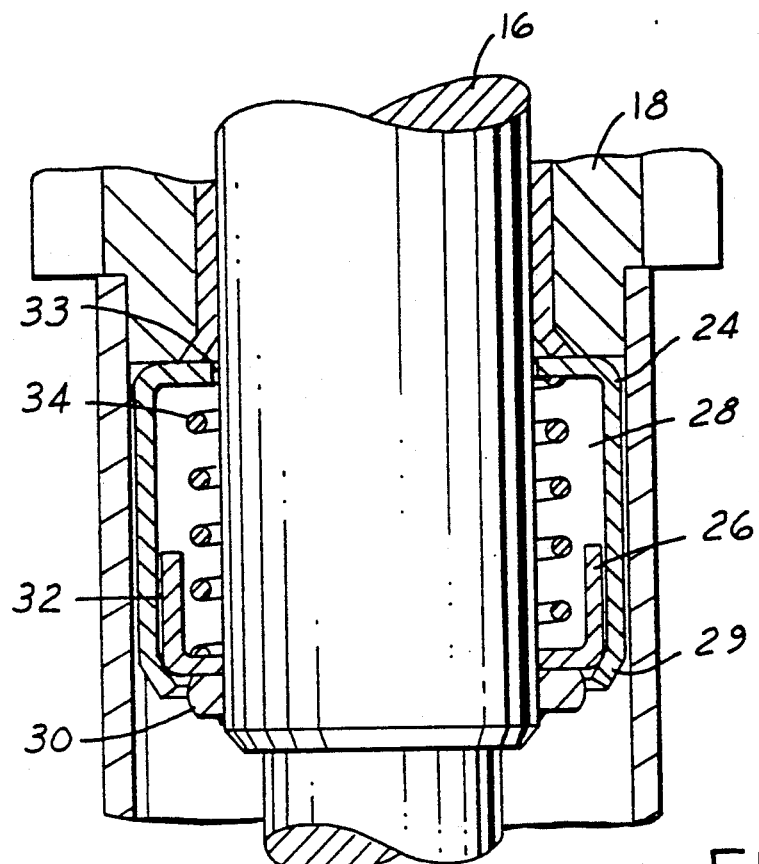
FIG. 2 is a view similar to FIG. 1 showing a rebound stop assembly in partial compression.
Figure 3:
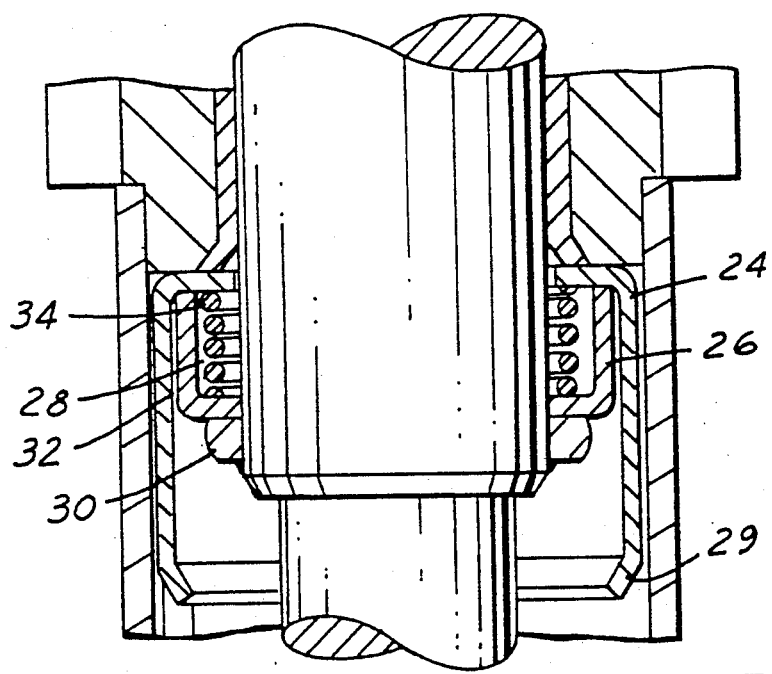
FIG. 3 is a view similar to FIG. 2 showing the rebound stop assembly in further compression.

When the piston rod 16 approaches the end of its rebound stroke, the assembly 22 provides additional damping as is shown in FIGS. 2 and 3. The assembly 22 moves upward through cylinder 12 until the planar surface 27 of the outer housing member 24 abuts the rod guide 18. Further upward motion of the piston rod 16 causes shoulder 30 and rod guide 18 to axially compress inner housing member 26 with respect to outer housing member 24 and spring 34 contained between the housing members. The axial movement of inner housing member 26 relative to outer housing member 24 causes fluid contained within damping chamber 28 to be forced out of damping chamber 28 and into rebound chamber 20 through annular clearance 32. A second passage 33 defined by the gap between outer housing member 24 and piston rod 16 on planar surface 27 provides a secondary flow passage to assist in the damping of the rebound stop assembly 22. This gap 33 can be varied in size to provide varied damping rates depending upon the system requirements.

As shown in FIG. 3, further upward movement of the piston rod 16 is damped by a highly restrictive fluid flow out of damping chamber 28 through annular clearances 32 and 33. The chamber 28 decreases in volume as the piston rod moves upwardly through the working cylinder. The passages 32 and 33 allow sufficient fluid flow from chamber 28 to prevent the hydraulic fluid therein from being excessively pressurized while providing the desired level of damping.

If the rebound stroke is sufficiently strong to continue against the additional damping, the inner housing member 26 continues until it abuts the interior side of the substantially planar surface 27 of the exterior housing member and further axial movement of the inner housing member with respect to the outer housing member 24 is prevented. At this point, the piston rod can no longer move upwardly. However, between the positions as shown in FIG. 1 and the position shown in FIG. 3, the rebound stop assembly 22 provides high damping of the rebound stroke to soften any severe impact which may otherwise occur when the piston rod 16 attains the position shown in FIG. 3. In most cases, the rebound stop assembly 22 may prevent any severe impact by totally damping the stroke before the piston rod 16 attains the position shown in FIG. 3.

After the piston rod 16 has achieved full rebound stroke within the working cylinder 12 of shock absorber 10, the piston 14 and piston rod 16 travel in the opposite, or jounce, direction. As the piston 14 moves axially down the working cylinder and stop assembly 22 is removed from rod guide 18, spring 34 biases housing members 24, 26 to their original positions, limited solely by turned over edge 29 of outer housing member 24. This allows chamber 28 to fill with hydraulic fluid in anticipation of the next rebound stroke of shock absorber 10.

Figure 5:
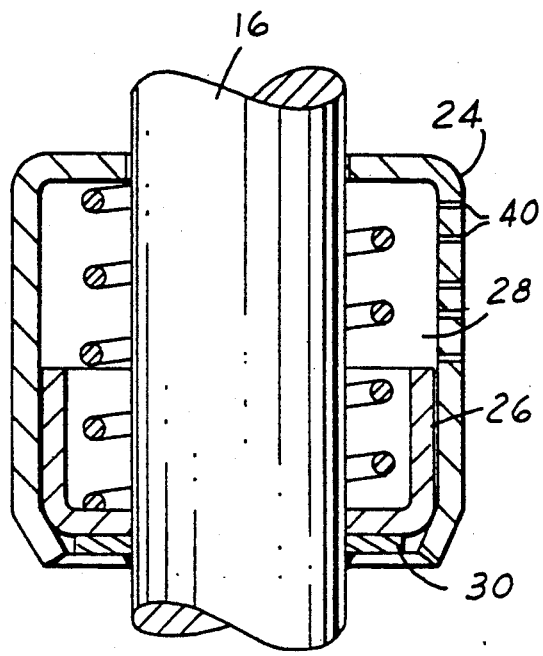
FIG. 5 is a cross-sectional view of an alternative embodiment of a rebound stop assembly of the present invention.
Figure 6:
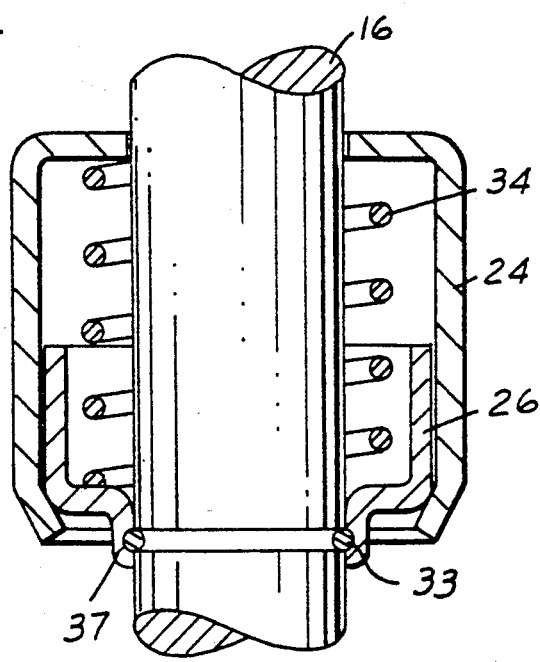
FIG. 6 is another alternative embodiment of the rebound stop assembly of the present invention.
Figure 7:
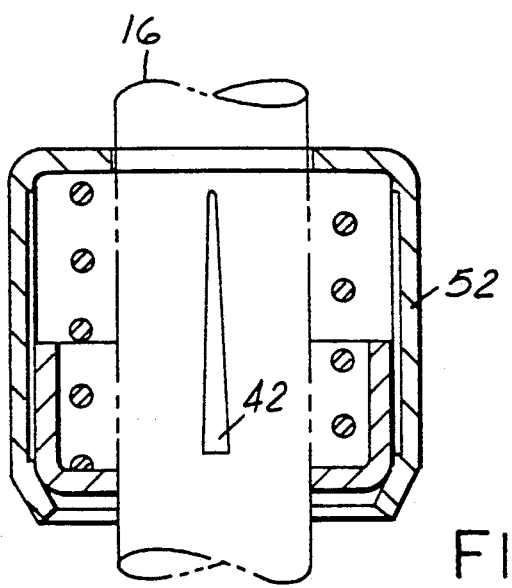
FIG. 7 is another alternative embodiment of the rebound stop assembly of the present invention.

FIGS. 5, 6 and 7 show alternative embodiments of the present invention structured in accordance with the principles of the present invention. In FIGS. 5, 6 and 7, like reference numerals will be used for elements that are unchanged from the previous figures. As shown in FIG. 5, metering orifices alternatively may be arranged to include axially spaced orifices 40 formed in the cylindrical walls of outer housing member 24' such that when inner housing member 26 axially moves within outer housing member 24', the metering orifices 40 form restrictive passages and restrict the flow of fluid from damping chamber 28 to chamber 68. Outer housing member 24' is configured to form a substantially tight fit with inner housing member 26 so that a minimal amount of fluid passes between the gap between the members. However, the inner housing member freely slides within outer housing member 24' so that friction between the members is prevented. Metering orifices 40 provide variable damping by assembly 22 as the inner housing member 26 slides into outer housing member 24'. Inner housing member covers the orifices as it moves with respect to outer housing member 24, decreasing the allowable orifice area for fluid removal and thus, increasing damping. The orifice pattern and size offer unlimited tuning capability for any application. It will be apparent to one skilled in the art that the number, size and position of metering orifices chosen will determine the amount of additional damping provided by the rebound stop assembly 22.

In FIG. 6, the inner housing member 26' is formed integrally with a retainer 33. In this manner, the rebound stop assembly 22 can easily be secured to piston rod 16 by any of a number of known joining operations. For example, piston rod 16 may include a circumferentially disposed groove into which the retainer 33 may be press fit. By integrally forming the inner housing member with the shoulder 30, the rebound stop assembly may easily be attached to piston rod 16. Localized staking 37 prevents housing 26' from moving axially upward with respect to piston rod 16.

In FIG. 7, metering grooves 42 may be formed axially within the cylindrical walls of outer housing member 54 such that when inner housing member 26 axially moves within outer housing member 54, the metering grooves 42 form restrictive passages and restrict the flow of fluid from damping chamber 28 to chamber 68. The grooves may be formed having constant width throughout their length or may be varied in width to provide variable damping as the inner housing member axially slides into damping chamber 28. Inner housing member covers the grooves as it moves with respect to outer housing member 54, decreasing the allowable orifice area for fluid removal and thus, increasing damping. The groove pattern and size offer unlimited tuning capability for any application. It will be apparent to one skilled in the art that the number of metering grooves chosen will determine the amount of additional damping provided by the rebound stop assembly 22.

In this fashion, an easily manufactured rebound stop is possible which provides high damping capabilities readily varied for specific applications as well as being economical to manufacture and easy to install on existing shock absorbers with minimal amount of modification. Variations and modifications of the present invention are possible without departing from its scope and spirit as defined by the appended claims. The embodiments of the invention in which an exclusive property or privilege is claimed are defined as follows:

I claim:

1. A hydraulic rebound stop assembly for use in a telescopic shock absorber having a working cylinder containing fluid, a piston slidably received within said working cylinder and defining a boundary for a rebound chamber within said cylinder, a piston rod connected to said piston and extending through one end of said working cylinder, closure means for closing said one end of said cylinder to define with said piston the rebound chamber and slidably mounting said piston rod, said hydraulic rebound stop assembly comprising:
   a generally cylindrical, cup-shaped outer housing member slidably disposed within said working cylinder, said outer housing member including a central aperture at one end thereof for receiving said piston rod therethrough;
   a generally cylindrical, cup-shaped inner housing member mounted to said piston rod and slidably disposed in said outer housing member and defining a damping chamber therebetween for receiving said fluid therein, said inner housing member including a central aperture at one thereof for receiving said piston rod therethrough;
   damping means operatively associated with said inner and outer housing members for creating a damping force in said shock absorber after a predetermined amount of rebound stroke of said piston within said working cylinder.

2. A hydraulic rebound stop assembly as defined in claim 1, wherein said damping means comprises means responsive to the relative axial movement of the inner housing member with respect to the outer housing member to control the flow of said fluid between said damping chamber and said rebound chamber.

3. A hydraulic rebound stop assembly as defined in claim 2, wherein said means responsive to the relative axial movement of the inner housing member with respect to the outer housing member to control the flow of said fluid between said damping chamber and said rebound chamber comprises an annular passage defined between said inner and outer housing members.

4. A hydraulic rebound stop assembly as defined in claim 3, wherein said means responsive to the relative axial movement of the inner housing member with respect to the outer housing member to control the flow of said fluid between said damping chamber and said rebound chamber further comprises an annular passage defined between said central aperture of said outer housing member and said piston rod.

5. A hydraulic rebound stop assembly as defined in claim 1, wherein said damping means comprises at least one orifice defined in said outer housing member and communicating with said working cylinder.

6. A hydraulic rebound stop assembly as defined in claim 1, further including spring means biasing the position of said outer housing member with respect to the position of said inner housing member.

7. A hydraulic rebound stop assembly as defined in claim 6, wherein said spring means is disposed within said damping chamber.

8. A hydraulic rebound stop assembly as defined in claim 1, wherein said outer housing member further includes means for limiting the axial movement of said outer housing member with respect to said inner housing member.

9. A hydraulic rebound stop assembly as defined in claim 8, wherein said means for limiting the axial movement of said outer housing member with respect to said inner housing member includes a turned over edge circumferentially disposed around one end of said outer housing member.

10. A hydraulic rebound stop assembly for use in a telescopic shock absorber having a working cylinder containing fluid, a piston slidably received within said working cylinder and defining a boundary for a rebound chamber within said cylinder, a piston rod connected to said piston and extending through one end of said working cylinder and including a shoulder circumferentially disposed there around, closure means for closing said one end of said cylinder and slidably mounting said piston rod, said hydraulic rebound stop assembly comprising:
   a generally cylindrical, cup-shaped outer housing member slidably disposed within said working cylinder, said outer housing member including a central aperture at one end thereof for receiving said piston rod therethrough;
   a generally cylindrical, cup-shaped inner housing member fixedly secured to said piston rod and slidably disposed in said outer housing member and defining a damping chamber therebetween for receiving said fluid therein, said inner housing member including a central aperture at one end thereof for receiving said piston rod therethrough;
   spring means biasing the position of said outer housing member with respect to the position of said inner housing member; and
   damping means operatively associated with said inner and outer housing members for creating a damping force in said shock absorber after a predetermined amount of rebound stroke of said piston within said working cylinder, said damping means comprising means responsive to the relative axial movement of the inner housing member with respect to the outer housing member to control the flow of said fluid between said damping chamber and said rebound chamber;
   whereby at the end of the rebound stroke of said piston rod, said inner housing member slides axially within said outer housing member so as to force said fluid from said damping means into said rebound chamber to create a damping force near the rebound end of the piston stroke.

11. A hydraulic rebound stop assembly as defined in claim 10, wherein said inner housing member is formed integrally with said shoulder and fixedly secured to said piston rod.

12. A hydraulic rebound stop assembly as defined in claim 10, wherein said means responsive to the relative axial movement of the inner housing member with respect to the outer housing member to control the flow of said fluid between said damping chamber and said rebound chamber comprises an annular passage defined between said inner and outer housing members.

13. A hydraulic rebound stop assembly as defined in claim 10, wherein said outer housing member further includes means for limiting the axial movement of said outer housing member with respect to said inner housing member.

14. A hydraulic rebound stop assembly as defined in claim 13, wherein said means for limiting the axial movement of said outer housing member with respect to said inner housing member includes a turned over edge circumferentially disposed around one end of said outer housing member.

15. A telescopic shock absorber comprising:
a working cylinder;
a piston rod and a piston mounted thereon slidably received within said working cylinder and dividing said cylinder into jounce and rebound chambers;
an end closure closing one end of said working cylinder and having an opening to slidably receive said piston rod;
said piston having flow control means constructed to provide a restrictive fluid passage for the controlled flow of hydraulic fluid from one of said chambers to the other of said chambers when said piston is moved in said working cylinder to thereby create a damping force;
a rebound stop assembly fixedly secured to and movable with said piston rod, comprising:
a generally cylindrical, cup-shaped outer housing member slidably disposed within said working cylinder, said outer housing member including a central aperture at one end thereof for receiving said piston rod therethrough;
a generally cylindrical, cup-shaped inner housing member fixedly secured to said piston rod and slidably disposed in said outer housing member and defining a damping chamber therebetween for receiving with said fluid therein, said inner housing member including a central aperture at one thereof for receiving said piston rod therethrough;
damping means operatively associated with said inner and outer housing members for creating a damping force in said shock absorber after a predetermined amount of rebound stroke of said piston within said working cylinder.

16. A telescopic shock absorber as defined in claim 15, wherein said damping means comprises means responsive to the relative axial movement of the inner housing member with respect to the outer housing member to control the flow of said fluid between said damping chamber and said rebound chamber.

17. A telescopic shock absorber as defined in claim 16, wherein said means responsive to the relative axial movement of the inner housing member with respect to the outer housing member to control the flow of said fluid between said damping chamber and said rebound chamber comprises an annular passage defined between said inner and outer housing members.

18. A telescopic shock absorber as defined in claim 17, wherein said means responsive to the relative axial movement of the inner housing member with respect to the outer housing member to control the flow of said fluid between said damping chamber and said rebound chamber further comprises an annular passage defined between said central aperture of said outer housing member and said piston rod.

19. A telescopic shock absorber as defined in claim 15, wherein said damping means comprises a plurality of axially spaced orifices defined in said outer housing member and communicating with said working cylinder to provide varying fluid flow from said damping means.

20. A telescopic shock absorber as defined in claim 15, further including spring means biasing the position of said outer housing member with respect to the position of said inner housing member.

21. A telescopic shock absorber as defined in claim 20, wherein said spring means is disposed within said damping chamber.

22. A telescopic shock absorber as defined in claim 15, wherein said outer housing member further includes means for limiting the axial movement of said outer housing member with respect to said inner housing member.

23. A telescopic shock absorber as defined in claim 22, wherein said means for limiting the axial movement of said outer housing member with respect to said inner housing member includes a turned over edge circumferentially disposed around one end of said outer housing member.

24. A telescopic shock absorber as defined in claim 15, wherein said damping means comprises at least one groove defined in said outer housing member to provide varying fluid flow from said damping means.

* * * * *